United States Patent
Shimizu

(10) Patent No.: US 6,563,534 B1
(45) Date of Patent: May 13, 2003

(54) HIGH DEFINITION TELEVISION CAMERA APPARATUS FOR CORRECTING A CHARACTERISTIC VALUE OF A VIDEO SIGNAL

(75) Inventor: Toshimichi Shimizu, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/048,112

(22) Filed: Mar. 26, 1998

(30) Foreign Application Priority Data

Mar. 27, 1997 (JP) .............................. 9-075478

(51) Int. Cl.⁷ ..................... H04N 5/228; H04N 5/232
(52) U.S. Cl. ................. 348/222.1; 348/211.5; 348/211.14; 348/254; 348/556
(58) Field of Search ................. 348/207, 211, 348/212, 213, 222, 231, 232, 233, 441, 445, 448, 449, 458, 459, 552, 555, 556, 714, 715, 716, 211.99, 211.4, 211.6, 211.9, 211.14, 222.1, 223.1, 224.1

(56) References Cited

U.S. PATENT DOCUMENTS

| | | | | |
|---|---|---|---|---|
| 4,449,143 A | * | 5/1984 | Dischert | 348/441 |
| 5,202,755 A | * | 4/1993 | Yang | 348/487 |
| 5,229,850 A | * | 7/1993 | Toyoshima | 348/153 |
| 5,361,099 A | * | 11/1994 | Kim | 348/555 |
| 5,486,853 A | * | 1/1996 | Baxter | 348/222 |
| 5,585,856 A | * | 12/1996 | Nakaya | 348/441 |
| 5,627,603 A | * | 5/1997 | Sakai | 348/708 |
| 5,751,375 A | * | 5/1998 | Ninomiya | 348/571 |
| 5,828,415 A | * | 10/1998 | Keating | 348/458 |
| 5,867,225 A | * | 2/1999 | Keating | 348/555 |
| 6,046,769 A | * | 4/2000 | Ikeda | 348/222 |

* cited by examiner

Primary Examiner—Ngoc-Yen Vu
(74) Attorney, Agent, or Firm—Antonelli, Terry, Stout & Kraus, LLP

(57) ABSTRACT

A high definition television image pickup apparatus includes a high definition television image pickup element for outputting a video signal, and a high definition television video signal correction circuit for correcting the video signal and outputting a corrected video signal having a first predetermined characteristic value being suitable for high definition television system which is a high definition television video signal. A transmission path transmits the high definition television video signal and a television signal conversion circuit converts the high definition television video signal into a first standard television video signal. A standard television video signal correction circuit corrects the first standard television video signal and outputs a corrected video signal having a second predetermined characteristic value suitable for a second standard television video signal.

11 Claims, 3 Drawing Sheets

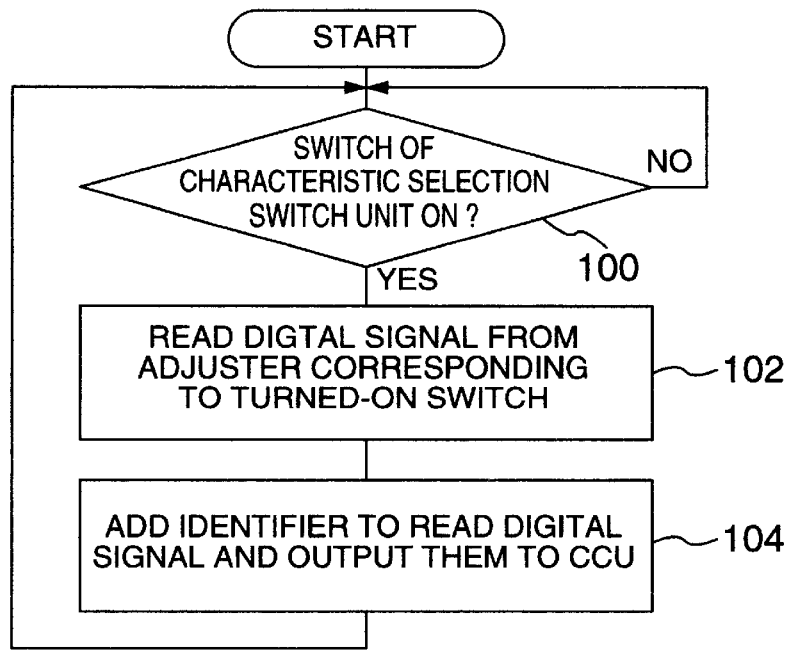
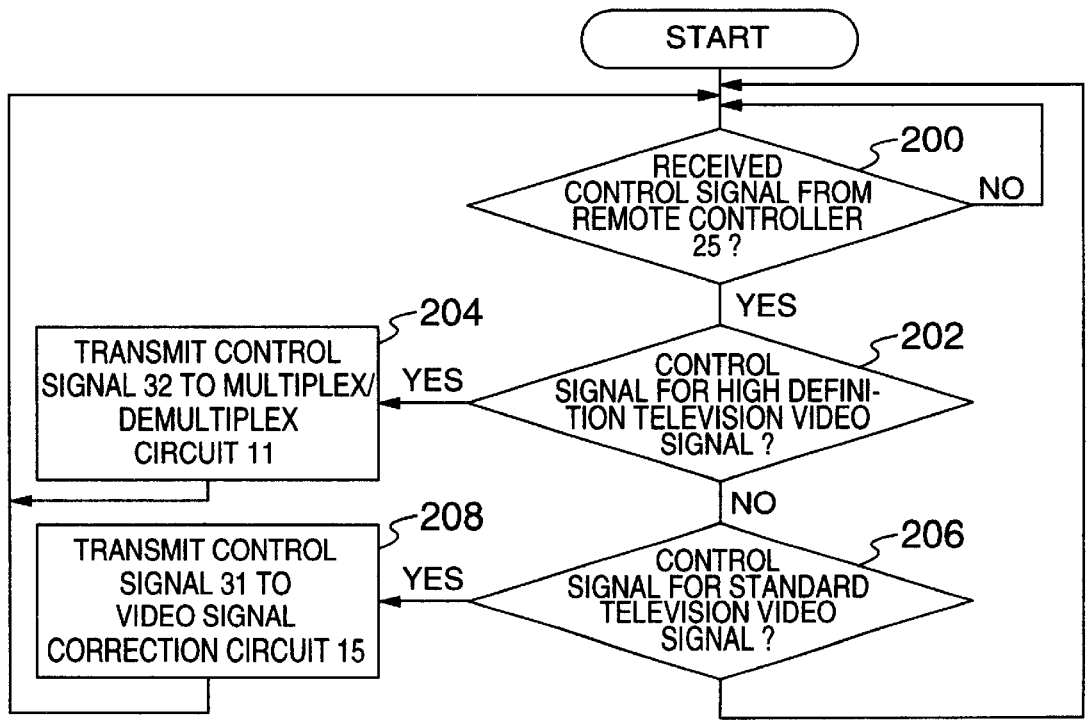

HIGH DEFINITION TELEVISION CAMERA APPARATUS FOR CORRECTING A CHARACTERISTIC VALUE OF A VIDEO SIGNAL

BACKGROUND OF THE INVENTION

1. Field of the Invention

The present invention relates to a high definition television camera apparatus, and more particularly to a high definition television camera apparatus constituted of a high definition television image pickup unit and a television signal processing unit and being capable of outputting a high definition television video signal and a standard television video signal converted from the high definition television video signal and capable of correcting each video signal to have characteristics (e.g., gamma characteristics) specific to each of standard television system and high definition television system.

2. Description of the Related Art

A television camera (television camera apparatus) is generally constituted of main components including a camera head (image pickup unit) and a camera control unit (CCU). A television camera with the integrated camera head and camera control unit is used widely. The camera head has: an image pickup lens for condensing an image light of an object; an image pickup element for photoelectrically converting light incident from the image pickup lens into video signals; a pre-amplifier for amplifying a video signal supplied from the image pickup element to a predetermined signal level; a gamma correction circuit for correcting the video signal to have a gamma value specific to a television system; and a video signal processing circuit for subjecting the gamma corrected video signal to necessary processes, including a knee process, a white clip process, a white balance adjusting process, a black balance adjusting process, a masking process and the like, to thereafter output the processed video signal having a desired level which is then supplied via a cable to the camera control unit.

The camera control unit processes the video signal having a desired level sent from the camera head via the cable in predetermined manners, and outputs the processed video signal having a predetermined level to various apparatuses such as a video monitor and a video tape recorder. The camera control unit also receives a control signal supplied from, for example, a remote controller, and outputs a necessary control signal to the camera head via the cable to thereby remotely control the necessary characteristic values to be used during the processes by the camera head, the values including a gamma characteristic value, a white balance value and the like.

The above-described structures of the camera head and the camera control unit are fundamental to a general television camera, and applicable to both standard and high definition television cameras.

As well known, the above-described characteristic correction circuit for a video signal, e.g., the gamma correction circuit, is a circuit for inversely correcting non-linear characteristics of an image pickup element of a camera head, an image display tube of a video monitor, and the like, in accordance with a correction amount corresponding to a predetermined gamma correction curve, so as to linearize the luminance transmission characteristics of the whole television system: from the television camera or camera head for picking up an image of an object and generating a video signal of the object image; to the video monitor for reproducing the object image from an input video signal.

For general gamma correction by a standard television video camera apparatus, a gamma value capable of properly correcting a video signal output from a television camera or camera head is usually set to 0.45 (an inverse of 2.2), assuming that the gamma value representative of a degree of a gamma correction curve used for linearizing non-linear characteristics of an image pickup element is about 1.0 (this gamma value is hereinafter called a gamma value of an image pickup element, where applicable) and the gamma value of a standard television display tube is about 2.2.

However, there are differences of many characteristics such as a gamma value and a luminance signal (Y) matrix of a video monitor, between a high definition television video signal monitor and a standard television video signal monitor. Therefore in many cases a proper gamma value for processing a video signal of a high definition television camera is different from that for processing a video signal of a standard television camera.

As described above, similar to a standard television camera, a high definition television camera also has a gamma correction circuit for correcting a gamma value for a high definition television video signal and outputting a gamma-corrected high definition television video signal matching a high definition television system. There is an apparatus, for example, a high definition television camera apparatus, which has a built-in television camera signal conversion circuit for converting a high definition television video signal output into a standard television video signal output. In such a high definition television camera apparatus, the television camera signal conversion circuit converts a high definition television video signal output supplied from the high definition television image pickup unit (camera head), with its gamma value having been corrected so as to match a high definition television system, into a standard television video signal output, without changing the gamma value. Therefore, the gamma value used for the gamma correction of the high definition television video signal is always the same as that used for the gamma correction of the standard television video signal output.

As above, in a high definition television camera apparatus constituted of a high definition television image pickup unit (camera head) and a television signal conversion circuit for converting a high definition television video signal output into a standard television video signal output, the same characteristic values such as a gamma value or other values not changed between the high definition and standard television systems are used.

Of various characteristics for a television video signal, proper values of the characteristics such as white balance and the like are generally the same. Therefore, even if the same characteristic values are used for both the high definition and standard television video signals, no practical problem occurs.

However, substantially different proper values of the characteristics such as black balance, gamma value, detail (contour), and masking are used for both the standard and high definition television video signals. Therefore, even if each of the characteristics such as black balance, gamma value, detail, and masking for a high definition television video signal is adjusted to have a proper value, this proper value becomes improper to a standard television video signal. Conversely, even if each of such characteristics for a standard television video signal is adjusted to have a proper value, this proper value becomes improper to a high definition television video signal.

Still further, in converting the high definition television video signal into a standard television video signal by the television camera signal conversion circuit, the characteristic values of the video signal, such as a black balance value, gamma value and detail value are changed because of the different specifications of the high definition and standard television video signals. Therefore, the characteristic values for the standard television video signal may become improper.

SUMMARY OF THE INVENTION

It is therefore a purpose of the present invention to provide a high definition television camera apparatus eliminating the above-described prior art problems.

It is another purpose of the present invention to provide a high definition television camera apparatus capable of independently adjusting each of predetermined characteristic values for a high definition television video signal output from a high definition television image pickup unit (camera head) and for a standard television video signal converted from the high definition television video signal by a television signal conversion circuit.

According to one aspect of the present invention, a high definition television camera apparatus is provided which comprises: a high definition television image pickup apparatus including a high definition television image pickup element for outputting a video signal, and a high definition television video signal correction circuit for correcting the video signal and outputting a corrected video signal having a predetermined characteristic value being suitable for high definition television system which is a high definition television video signal;

a transmission path for transmitting the high definition television video signal supplied from the high definition television image pickup apparatus; and a camera control apparatus including a television signal conversion circuit for converting the high definition television video signal transmitted via the transmission path into a first standard television video signal and outputting the first standard television video signal, a standard television video signal correction circuit for correcting the first standard television video signal and outputting a corrected video signal having a predetermined characteristic value being suitable for standard television system which is a second standard television video signal, a standard television video signal output terminal coupled with the standard television video signal correction circuit, and a high definition television video signal output terminal coupled with the transmission path.

According to another aspect of the present invention, a high definition television camera apparatus is provided which comprises: a control unit comprising: a high definition television video signal characteristic value adjusting unit for setting a characteristic value for a high definition television video signal; a standard television video signal characteristic value adjusting unit for setting a characteristic value for a standard television video signal; and a controller for outputting a high definition television video signal control signal representative of the set value set by the high definition television video signal characteristic value adjusting unit and a standard television video signal control signal representative of the set value set by the standard television video signal characteristic value adjusting unit; a high definition television image pickup unit for outputting a high definition television video signal, the high definition television video signal, the high definition television image pickup unit comprising: a high definition television image pickup element for picking up an image of an object and outputting a high definition television video signal of the object; and a high definition television video signal correction circuit for correcting a characteristic value for the high definition television video signal supplied from the image pickup element to have the set value represented by the high definition television video signal control signal supplied from the control unit and outputting the high definition television video signal having the set value; and a camera control unit comprising: a high definition television video signal output terminal from which the high definition television video signal itself transmitted via a transmission path from the high definition television image pickup unit is output; a television signal conversion circuit for converting the high definition television video signal supplied from the high definition television image pickup unit into the standard television video signal and outputting the standard television video signal; a standard television video signal correction circuit for correcting a characteristic value for the standard television video signal supplied from the television signal conversion circuit to have the set value represented by the standard television video signal control signal supplied from the control unit and outputting the standard television video signal having the set value; and a standard television video signal output terminal from which the standard television video signal from the standard television video signal correction circuit is output.

In one example of the invention, the high definition television video signal correction circuit corrects a gamma value for the high definition television video signal supplied from the image pickup element to have a proper value for the high definition television video signal and output the high definition television video signal having the first predetermined characteristic value, and the standard television video signal correction circuit corrects a gamma value for the standard television video signal supplied from the television signal conversion circuit to have a proper value for the standard definition television video signal and output the standard television video signal having the second predetermined characteristic value.

In another example of the invention, the high definition television video signal correction circuit further corrects at least one of detail, black balance and masking values for the high definition television video signal supplied from the image pickup element to have a proper value for the high definition television video signal and output the high definition television video signal having the first predetermined characteristic value, and the standard television video signal correction circuit further corrects at least one of detail, black balance and masking values for the standard television video signal supplied from the television signal conversion circuit to have a proper value for the standard definition television video signal and output the standard television video signal having the second predetermined characteristic value.

According to the invention, therefore, the characteristic values such as a gamma value for the high definition television video signal and for the standard television video signal converted from the high definition television video signal can be independently adjusted to have proper values.

In another example of the invention, the control unit further comprises an associative characteristic value adjusting unit for setting in combination characteristic values for both the high precision and standard television video signals, and the controller corrects a set value set by the high definition television signal characteristic value adjusting unit in accordance with a set value set by the associative characteristic value adjusting unit, and outputs the corrected set value as the high precision television video signal control signal, and the controller corrects a set value set by the standard television signal characteristic value adjusting unit in accordance with the set value set by the associative characteristic value adjusting unit, and outputs the corrected set value as the standard television video signal control signal.

Therefore, in the high definition television camera apparatus constructed as above, the characteristic values for both the high definition and standard television video signals can be adjusted in combination to have proper values or desired values.

BRIEF DESCRIPTION OF THE DRAWINGS

FIG. 2 is a flow chart illustrating an operation to be executed by a CPU of a remote control unit.

FIG. 3 is a flow chart illustrating an operation to be executed by a CPU in a camera control unit (CCU).

DETAILED DESCRIPTION OF THE PREFERRED EMBODIMENTS

Figure 1:
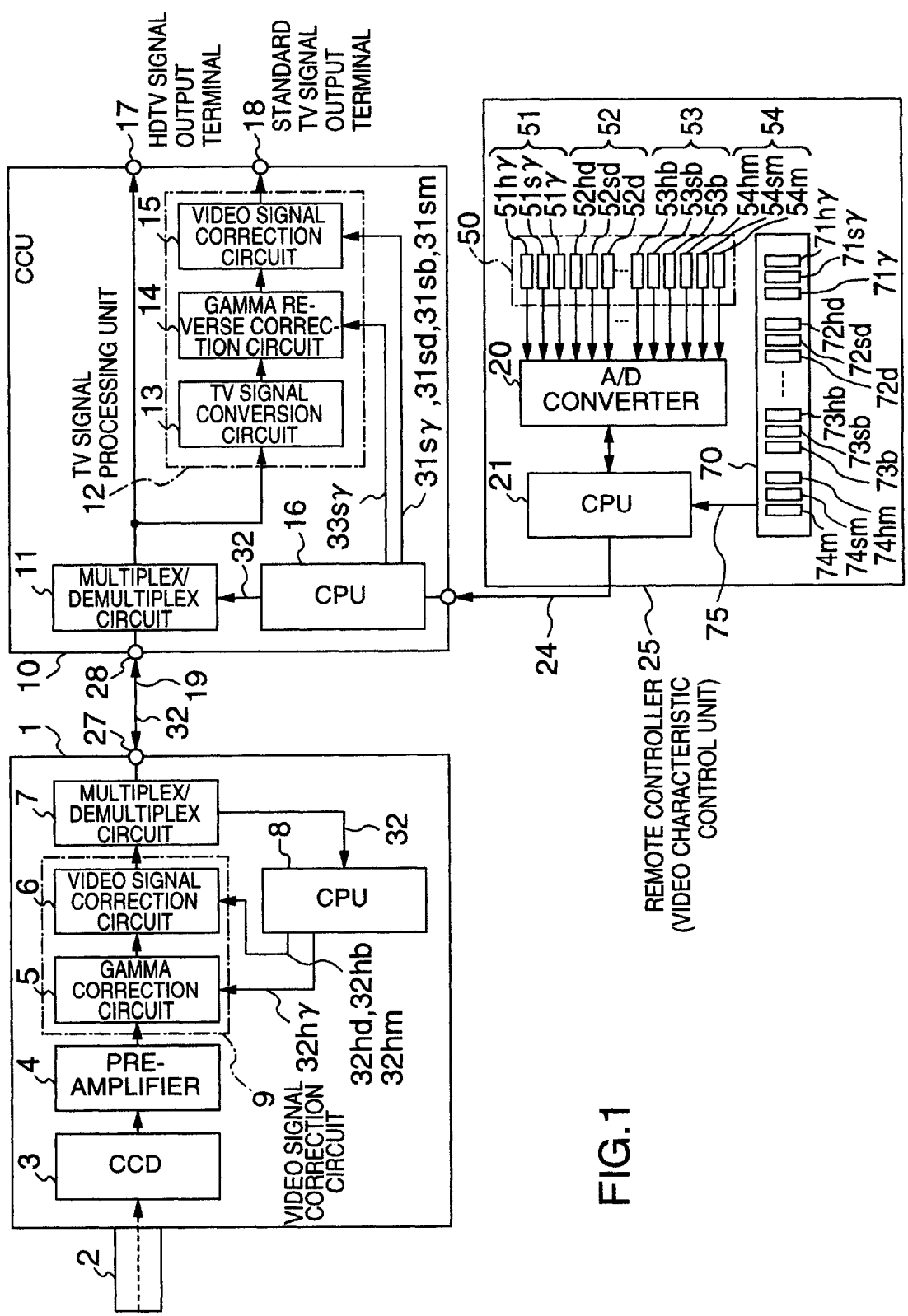
FIG. 1 is a block diagram showing the structure of a high definition television camera apparatus according to an embodiment of the present invention.

With reference to FIG. 1, a high definition television camera apparatus according to an embodiment of the invention will be described, which apparatus includes a built-in high definition television image pickup unit (camera head) and a built-in camera control unit with a television signal conversion circuit.

FIG. 1 is a block diagram of the high definition television camera apparatus (either a color television camera apparatus or a monochrome television camera apparatus) of the embodiment having a built-in high definition television image pickup unit (camera head) and a built-in television signal processing unit.

Referring to FIG. 1, reference numeral 1 represents a camera head constituting the high definition television image pickup unit, reference numeral 2 represents an image pickup lens for condensing an image light of an object, reference numeral 3 represents an image pickup element, e.g., a charge coupled device (CCD), for photoelectrically converting light incident from the image pickup lens 2 into video signals, and reference numeral 4 represents a pre-amplifier for amplifying a video signal supplied from the image pickup element 3 to a predetermined level.

Reference numeral 9 represents a video signal processing circuit for processing a video signal supplied from the pre-amplifier 4. The video signal processing circuit 9 has a first gamma correction circuit 5 for performing a gamma correction relative to a video signal having a predetermined level supplied from the pre-amplifier 4, and a video signal correction circuit 6 for correcting various characteristics of the gamma-corrected video signal supplied from the gamma correction circuit 5. The first gamma correction circuit 5 corrects the input video signal having a predetermined level in accordance with a predetermined gamma correction curve for a high definition television video signal. Specifically, in the high definition television camera apparatus, if the gamma value of the image pickup element is 1.0 and that of a high definition television display tube is a, the first gamma correction circuit 5 corrects the gamma value for a high definition television video signal supplied from the pre-amplifier 4, in accordance with a gamma correction curve having a proper gamma value, e.g., 1/a. The video signal correction circuit 6 sets the characteristic values of a high definition television video signal to proper values, by performing the knee process, white clip process, white balance adjusting process, black balance adjusting process, masking process and the like, and sends the high definition television video signal with proper characteristic values to a multiplex/demultiplex circuit 7.

The multiplex/demultiplex circuit 7 multiplexes the high definition television video signal processed by the video signal processing circuit 9 with other signals and supplies the multiplexed signal to the camera control unit 10 via a terminal 27, a cable 19 and a return terminal 28, or demultiplexes control signals 32 and other signals transmitted from the camera control unit 10 via the return terminal 28, cable 19 and terminal 27 and supplies the demultiplexed control signals 32 to a central processing unit (CPU) 8. In accordance with the control signals 32 supplied from the multiplex/demultiplex circuit 7, CPU 8 controls the gamma correction circuit 5 and video signal correction circuit 6 of the video signal processing circuit 9 and other unrepresented components of the camera head 1.

Reference numeral 10 represents the camera control unit (CCU) constituting the high definition television camera apparatus. Reference numeral 11 represents a multiplex/demultiplex circuit for multiplexing control signals 32 and the other signals supplied from a central processing unit (CPU) 16 for controlling the circuits in the camera head 1, and outputting the multiplexed control signals to the camera head 1. The multiplex/demultiplex circuit 11 demultiplexes the high definition television video signal and the other signals transmitted via the cable 19 from the camera head 1, and supplies the demultiplexed high definition television video signal to a high definition television video signal output terminal 17 and to a television signal processing unit 12. The video signal output from the high definition television output terminal 17 is supplied as a high definition television video signal to an unrepresented external apparatus such as a video monitor and a video tape recorder. The video signal output from the high definition television output terminal 17 has proper values of all the characteristic values of the high definition television video signal.

The television signal processing unit 12 has a television signal conversion circuit 13, a gamma reverse correction circuit 14, and a video signal correction circuit 15. The television signal conversion circuit 13 converts the high definition television video signal supplied from the multiplex/demultiplex circuit 11 into a standard television video signal and supplies it to the gamma reverse correction circuit 14. The gamma reverse correction circuit 14 reversely corrects the gamma value 1/a of the converted standard television video signal supplied from the television signal conversion circuit 13 to obtain a video signal equivalent to the gamma value 1, in accordance with a correction curve having the gamma value a.

The video signal correction circuit 15 sets each of the characteristic values for the standard television video signal supplied from the gamma reverse correction circuit 14, to proper values. Specifically, with respect to the gamma value for the standard television video signal supplied from the gamma reverse correction circuit 14, the gamma value for the standard television video signal is set to a proper value, e.g., 0.45. Similarly, the video signal correction circuit 15 makes the standard television video signal supplied from the gamma reverse correction circuit 14 be subjected to the knee process, white clip process, white balance adjusting process, black balance adjusting process, masking process and the like, to obtain proper characteristic values for the standard television video signal. The standard television video signal from the video signal correction circuit 15 is output from the standard television video signal output terminal 18 to an unrepresented external apparatus such as a video monitor and a video tape recorder.

Reference numeral 16 represents CPU which controls the gamma reverse correction circuit 14 and video signal correction circuit 15 of the camera control unit 10, in accordance with control signals sent via a cable 24. CPU 16 also controls unrepresented components of the camera control unit 10.

Reference numeral 25 represents a video characteristic control unit serving as a remote controller for controlling the video signal processing circuit 9 of the camera head 1 and the gamma reverse correction circuit 14 and video signal correction circuit 15 of CCU 10. The video characteristic control unit 25 has a video characteristic adjusting unit 50, an A/D converter 20, a characteristic selection switch unit 70 for selecting a characteristic to be adjusted, and a CPU 21. The video characteristic adjusting unit 50 adjusts each of characteristic values for the high definition and standard television video signals. The A/D (analog-to-digital) converter 20 A/D converts an analog signal (e.g., analog voltage value) representative of a characteristic value supplied from the video characteristic adjusting unit 50 into a digital signal representative of the characteristic value. CPU 21 fetches a digital signal from the A/D converter 20, the digital signal corresponding to the characteristic value selected by the characteristic selection switch unit 70. CPU 21 adds an identifier to the fetched digital signal, for example, at a header portion of the digital signal, and transmits them as the control signal to CPU 16 of CCU 10 via a cable 24.

In this embodiment, the video characteristic adjusting unit 50 includes a gamma adjusting unit 51, a detail adjusting unit 52, a black balance adjusting unit 53, and a masking adjusting unit 54. The gamma adjusting unit 51 has a gamma adjuster 51*h*γ for adjusting a gamma value for the high definition television video signal, a gamma adjuster 51*s*γ for adjusting a gamma value for the standard television video signal, and an associative gamma adjuster 51γ for adjusting in combination the gamma values for both the high definition and standard television video signals. The detail adjusting unit 52 has a detail adjuster 52*hd* for adjusting a detail value for the high definition television video signal, a detail adjuster 52*sd* for adjusting a detail value for the standard television video signal, and an associative detail adjuster 52*d* for adjusting in combination the detail values for both the high definition and standard television video signals. The black balance adjusting unit 53 has a black balance adjuster 53*hb* for adjusting a black balance value for the high definition television video signal, a black balance adjuster 53*sb* for adjusting a black balance value for the standard television video signal, and an associative black balance adjuster 53*b* for adjusting in combination the black balance values for both the high definition and standard television video signals. The masking adjusting unit 54 has a masking adjuster 54*hm* for adjusting a masking value for the high definition television video signal, a masking adjuster 54*sm* for adjusting a black balance value for the standard television video signal, and an associative masking balance adjuster 54*m* for adjusting in combination the masking values for both the high definition and standard television video signals. Each of these adjusters may be made of a variable resistor or a rotary encoder.

An operator adjusts an analog output value of each of the adjusters to thereby adjust each of the characteristic values for the high definition and standard television video signals to make it have a proper value.

Specific operations to be executed by an operator for the adjustment of characteristic values with these adjusters will be described.

In adjusting a gamma value for the high definition television video signal, an operator picks up an image of a grey scale chart, displays the high definition television video signal of the picked-up grey scale chart image on a high definition television video signal waveform monitor, and adjusts the gamma value with the gamma adjuster 51*h*γ in such a manner that an amplification factor of the displayed waveform becomes linear with respect to its waveform amplitude. Similarly, in adjusting a gamma value for the standard television video signal, an operator displays a standard television video signal on a standard television video signal waveform monitor, and adjusts the gamma value with the gamma adjuster 51*s*γ. In adjusting the gamma values for both the high definition and standard television video signals with the associative gamma adjuster 51γ, an operator displays at least one of the high definition and standard television video signals on a waveform monitor to adjust one gamma value so that both the gamma values in relation with each other can be adjusted same tendentiously.

In adjusting a detail emphasis value for the high definition television video signal, an operator picks up an image of an optional object, displays the high definition television video signal of the picked-up object image on a high definition television video monitor, and adjusts the detail emphasis value for the object image with the detail adjuster 52*hd*. Similarly, in adjusting a detail emphasis value for the standard television video signal, an operator displays a standard television video signal on a standard television video monitor, and adjusts the detail emphasis value with the detail adjuster 52*sd*. In adjusting the detail emphasis values for both the high definition and standard television video signals with the associative detail adjuster 52*d*, an operator displays at least one of the high definition and standard television video signals on a video monitor to adjust one detail emphasis value so that both the detail emphasis values in relation with each other can be adjusted same tendentiously.

In adjusting a black balance value for the high definition television video signal, an operator picks up an image of black and white objects, displays the high definition television video signal of the picked-up object images on a high definition television video signal waveform monitor, and adjusts the black balance value with the black balance adjuster 53*hb* in such a manner that a waveform amplitude ratio of the black to white object of the displayed waveform takes a predetermined value. Similarly, in adjusting a black balance value for the standard television video signal, an operator displays a standard television video signal on a waveform monitor, and adjusts the black balance value with the black balance adjuster 53*sb*. In adjusting the black balance values for both the high definition and standard television video signals with the associative black balance adjuster 53*b*, an operator displays at least one of the high definition and standard television video signals on a waveform monitor to adjust one black balance value so that both the black balance values in relation with each other can be adjusted same tendentiously.

In adjusting a masking value for the high definition television video signal, an operator picks up an image of a color chart having a plurality of colors, displays the high definition television video signal of the picked-up color chart image on a high definition television video display monitor, and adjusts the masking value with the masking adjuster 54*hm* while viewing the coloring degree of each color displayed on the display monitor. Similarly, in adjusting a masking value for the standard television video signal, an operator displays a standard television video signal on a standard television video display monitor, and adjusts the masking value with the masking adjuster 53*sm*. In adjusting the masking values for both the high definition and standard television video signals with the associative masking adjuster 54*m*, an operator displays at least one of the high definition and standard television video signals on a display monitor to adjust one masking value so that both the masking values in relation with each other can be adjusted same tendentiously.

An analog signal output from each adjuster of the video characteristic adjusting unit 50 is converted into a digital signal by the A/D converter 20 and supplied to CPU 21.

In this embodiment, the characteristic selection switch unit 70 has a gamma selection switch unit 71, a detail selection switch unit 72, a black balance selection switch unit 73, and a masking selection switch unit 74. The gamma selection switch unit 71 has a gamma selection switch 71*h*γ for selecting a gamma value for the high definition television video signal, a gamma selection switch 71*s*γ for selecting a gamma value for the standard television video signal, and a gamma selection switch 71γ for selecting in combination the gamma values for both the high definition and standard television video signals. The detail selection switch unit 72 has a detail selection switch 72*hd* for selecting a detail value for the high definition television video signal, a detail selection switch 72*sd* for selecting a detail value for the standard television video signal, and a detail selection switch 72*d* for selecting in combination the detail values for both the high definition and standard television video signals. The black balance selection switch unit 73 has a black balance selection switch 73*hb* for selecting a black balance value for the high definition television video signal, a black balance selection switch 73*sb* for adjusting a black balance value for the standard television video signal, and a black balance selection switch 73*b* for selecting in combination the black balance values for both the high definition and standard television video signals. The masking selection switch unit 74 has a masking selection switch 74*hm* for selecting a masking value for the high definition television video signal, a masking selection switch 74*sm* for adjusting a masking value for the standard television video signal, and a masking selection switch 74*m* for adjusting in combination the masking values for both the high definition and standard television video signals. When each of these switches is turned on, a signal 75 representative of a selection of a characteristic value corresponding to the switch is supplied to CPU 21. In this manner, an operator can select a desired characteristic by selectively turning each switch on.

Next, the operation of the high definition television camera apparatus of the embodiment constructed as above will be described. FIG. 2 is a flow chart illustrating the operation of CPU 21 of the video characteristic control unit 25.

An operator adjusts a desired adjuster (e.g., gamma adjuster 51*h*γ for the high definition television video signal) among those adjusters of the video characteristic adjusting unit 50. Next, among those switches of the characteristic selection switch unit, the switch (i.e., gamma selection switch 71*h*γ of the high definition television video signal) is turned on. CPU 21 checks whether any switch of the characteristic selection switch unit 70 has been turned on, i.e., whether a signal 75 for designating an adjustment subject has been input from the characteristic selection switch unit 70 (Step 100). Upon reception of the signal 75 for designating an adjustment subject from the characteristic selection switch unit 70, CPU 21 fetches an output signal representative of the adjuster (i.e., gamma adjuster 51*h*γ) corresponding to the turned-on switch, from the A/D converter 20 (Step 102). Next, an identifier for identifying an adjustment subject is added to a header field of the fetched digital signal, and they are sent as a control signal 32*h*γ (indicating an adjusted gamma value for the high definition television video signal) to CPU 16 of CCU 10 via the cable 24 (Step 104).

Similarly, if the gamma adjuster 51*s*γ for the standard television video signal is adjusted and when the gamma selection switch 71*s*γ for the standard television video signal is turned on, CPU 21 outputs a control signal 31*s*γ indicating an adjusted value of the gamma adjuster 51*s*γ and having an identifier for identifying an adjustment subject at its header field.

If the detail adjuster 52*hd* for the high definition television video signal is adjusted and when the detail selection switch 72*hd* for the high definition television video signal is turned on, CPU 21 outputs a control signal 32*hd* indicating an adjusted value of the detail adjuster 52*hd* and having an identifier for identifying an adjustment subject at its header field. If the detail adjuster 52*sd* for the standard television video signal is adjusted and when the detail selection switch 72*sd* for the standard television video signal is turned on, CPU 21 outputs a control signal 31*sd* indicating an adjusted value of the detail adjuster 52*sd* and having an identifier for identifying an adjustment subject at its header field.

Further, if the black balance adjuster 53*hb* for the high definition television video signal is adjusted and when the black balance selection switch 72*hb* for the high definition television video signal is turned on, CPU 21 outputs a control signal 32*hb* indicating an adjusted value of the black balance adjuster 53*hb* and having an identifier for identifying an adjustment subject at its header field. If the black balance adjuster 53*sb* for the standard television video signal is adjusted and when the black balance selection switch 72*sb* for the standard television video signal is turned on, CPU 21 outputs a control signal 31*sb* indicating an adjusted value of the black balance adjuster 53*sb* and having an identifier for identifying an adjustment subject at its header field.

Still further, if the masking adjuster 54*hm* for the high definition television video signal is adjusted and when the masking selection switch 72*hm* for the high definition television video signal is turned on, CPU 21 outputs a control signal 32*hm* indicating an adjusted value of the masking adjuster 54*hm* and having an identifier for identifying an adjustment subject at its header field. If the masking adjuster 53*sm* for the standard television video signal is adjusted and when the masking selection switch 72*sm* for the standard television video signal is turned on, CPU 21 outputs a control signal 31*sm* indicating an adjusted value of the masking adjuster 54*sm* and having an identifier for identifying an adjustment subject at its header field.

In the following, the operation of CCU 10 in response to each control signal supplied from the remote controller 25 will be described. FIG. 3 is a flow chart illustrating the operation of CPU 16 of CCU 10. CPU 16 checks whether a control signal has been received from the remote controller 25 via the cable 24 (Step 200). If received, it is checked from the identifier in the header portion whether the received control signal is one of the control signals 32 (32*h*γ, 32*hd*, 32*hb*, 32*hm*) each indicating an adjustment value for the high definition television video signal (Step 202). If so, the control signal is output to the multiplex/demultiplex circuit 11 (Step 204). The multiplex/demultiplex circuit 11 multiplexes the received control signal 32 with other signals and sends the multiplexed signal to the camera head 1 via the cable 19.

The multiplexed signal transmitted to the camera head 1 is received by the multiplex/demultiplex circuit 7 which demultiplexed the control signal 32 from the other signals and sends it to CPU 8. If the received control signal 32 is the control signal 32$h\gamma$ indicating an adjustment value of the gamma value for the high definition television video signal, CPU 8 supplies this control signal 32$h\gamma$ to the gamma correction circuit 5 which sets the gamma value for the high definition television video signal supplied from the pre-amplifier 4 to an adjustment value Vh$\gamma$ of the gamma adjuster 51$h\gamma$.

If the received control signal 32 is one of the control signals 32$hd$, 32$hb$ and 32$hm$ indicating detail, black balance and masking adjustment values for the high definition television video signal, CPU 8 supplies this control signal 32 to the video signal correction circuit 6 which performs a corresponding one of the detail compensation, black balance and masking processes to thereby set the corresponding characteristic value to the adjustment value.

If the received control signal is the control signal 32$h\gamma$ indicating an adjustment value Vh$\gamma$ of the gamma value for the high definition television video signal, CPU 16 supplies a control signal 33$s\gamma$ to the reverse gamma correction circuit 14, the control signal 33$s\gamma$ being a reverse gamma correction value which is an inverse of Vh$\gamma$, or 1/Vh$\gamma$. Therefore, the reverse gamma correction circuit 14 reversely corrects the standard television video signal converted from the high definition television video signal, in accordance with a gamma correction curve having a gamma value of 1/Vh$\gamma$.

CPU 16 checks from the identifier in the header portion whether the control signal received from the remote controller 25 via the cable 24 is one of the control signals 31 (31$s\gamma$, 31$sd$, 31$sb$, 31$sm$) indicating gamma, detail, black balance and masking adjustment values for the standard television video signal (Step 206). If so, the control signal is supplied to the video signal correction circuit 15 which performs a corresponding at least one of the gamma correction, detail compensation, black balance adjustment, and masking processes so that the corresponding characteristic value is set to the adjustment value.

As above, an operator selects a desired adjustment subject by using the video characteristic adjusting unit 50, particularly its characteristic selection switch unit 70, and adjusts the characteristic value so that the characteristic values can be set to proper values both for the high definition television video signal output from the high definition television video signal output terminal 17 and for the standard television video signal output from the standard television video signal output terminal 18. By adjusting the characteristic value with the adjuster of the video characteristic adjusting unit 50, the characteristic value can be set to a desired value for the high definition television video signal and/or standard television video signal. For example, a proper value of the gamma value of 0.45 for the standard television video signal can be set to an optional value desired by an operator, by using the adjuster 51$s\gamma$.

Instead of independently adjusting each characteristic value for the high definition and standard television video signals, as described above, the characteristic values for both the high definition and standard television video signals may be adjusted in combination at the same time by using the associative adjuster 51$\gamma$, 52$d$, 53$b$ or 54$m$.

Specifically, if the associative gamma adjuster 51$\gamma$ is used in order to adjust the gamma values in combination for both the high definition and standard television video signals, the gamma selection switch 71$\gamma$ is turned on. Then, CPU 21 reads an adjustment value of the associative gamma adjuster 51$\gamma$ from the A/D converter 20, and also reads an adjustment value of the gamma adjuster 51$h\gamma$ for the high definition television video signal and an adjustment value of the gamma adjuster 51$s\gamma$ for the standard television video signal from the A/D converter 20. For example, CPU 21 adds the adjustment value of the gamma adjuster 51$h\gamma$ to the adjustment value of the associative gamma adjuster 51$\gamma$ to use the addition value as the gamma adjustment value for the high definition television video signal, and outputs the control signal 32$h\gamma$ indicating the gamma adjustment value. Similarly, the adjustment value of the gamma adjuster 51$s\gamma$ is added to the adjustment value of the associative gamma adjuster 51$\gamma$ to use the addition value as the gamma adjustment value for the standard television video signal and output the control signal 31$s\gamma$ indicating the gamma adjustment value.

Similarly, if the associative detail adjuster 52$d$ is used in order to adjust the detail values in combination for both the high definition and standard television video signals, the detail selection switch 72$d$ is turned on. Then, CPU 21 reads an adjustment value of the associative detail adjuster 52$d$ from the A/D converter 20, and also reads an adjustment value of the detail adjuster 52$hd$ for the high definition television video signal and an adjustment value of the detail adjuster 52$sd$ for the standard television video signal from the A/D converter 20. For example, CPU 21 adds the adjustment value of the detail adjuster 52$hd$ to the adjustment value of the associative detail adjuster 52$d$ to use the addition value as the detail adjustment value for the high definition television video signal, and outputs the control signal 32$hd$ indicating the detail adjustment value. Similarly, the adjustment value of the detail adjuster 52$sd$ is added to the adjustment value of the associative detail adjuster 52$d$ to use the addition value as the detail adjustment value for the standard television video signal and output the control signal 31$sd$ indicating the detail adjustment value.

Similarly, if the associative black balance adjuster 53$b$ is used in order to adjust the black balance values in combination for both the high definition and standard television video signals, the black balance selection switch 73$b$ is turned on. Then, CPU 21 reads an adjustment value of the associative black balance adjuster 53$b$ from the A/D converter 20, and also reads an adjustment value of the black balance adjuster 53$hb$ for the high definition television video signal and an adjustment value of the black balance adjuster 53$sb$ for the standard television video signal from the A/D converter 20. For example, CPU 21 adds the adjustment value of the black balance adjuster 53$hb$ to the adjustment value of the associative black balance adjuster 53$b$ to use the addition value as the black balance value for the high definition television video signal, and outputs the control signal 32$hb$ indicating the detail adjustment value. Similarly, the adjustment value of the black balance adjuster 53$sb$ is added to the adjustment value of the associative black balance adjuster 53$b$ to use the addition value as the black balance adjustment value for the standard television video signal and output the control signal 31$sb$ indicating the black balance adjustment value.

Similarly, if the associative masking adjuster 54$m$ is used in order to adjust the masking values in combination for both the high definition and standard television video signals, the masking selection switch 74m is turned on. Then, CPU 21 reads an adjustment value of the associative masking adjuster 54m from the A/D converter 20, and also reads an adjustment value of the masking adjuster 54hm for the high definition television video signal and an adjustment value of the masking adjuster 54sm for the standard television video signal from the A/D converter 20. For example, CPU 21 adds the adjustment value of the masking adjuster 54hm to the adjustment value of the associative masking adjuster 54m to use the addition value as the masking value for the high definition television video signal, and outputs the control signal 32hm indicating the masking adjustment value. Similarly, the adjustment value of the masking adjuster 54sm is added to the adjustment value of the associative masking adjuster 54m to use the addition value as the masking adjustment value for the standard television video signal and output the control signal 31sm indicating the masking adjustment value.

If the control signal received from the remote controller 25 via the cable 24 is judged, from the identifier in the header field, as one of the control signals 32 (31hr, 31hd, 31hb and 31hm) for the high definition television video signal, CPU 16 transmits it to the multiplex/demultiplex circuit 11, whereas if the control signal is judged as one of the control signals 31 (31sγ, 31sd, 31sb, and 31sm) for the standard television video signal, CPU 16 transmits it to the video signal correction circuit 15. As described above, if the received control signal is the control signal 32hγ indicating the gamma adjustment value Vhγ for the high definition television video signal, CPU 16 supplies the control signal 33sγ indicating the inverse 1/Vhγ as the gamma reverse correction value, to the reverse gamma correction circuit 14.

As described above, in a high definition television camera apparatus of this invention having a built-in television signal conversion circuit for converting a high definition television video signal into a standard television video signal, each characteristic value for the high definition and standard television video signals can be adjusted to a proper value. Further, the characteristic values for both the high definition and standard television video signals can be adjusted in combination to proper values, so that proper or desired characteristic values for both the high definition and standard television video signals can be set at the same time in short time.

In the above embodiment, the reverse gamma correction circuit 14 is provided in the television signal processing unit 12. It is therefore unnecessary for the camera head 1 to be provided with a dedicated circuit for the standard television video signal and the structure of the camera head 1 can be made compact. Further, the cable 19 is sufficient if only it can transmit only the high definition television video signal, so that the cable capacity can be reduced.

In the above embodiment, although the remote controller 25 and CCU 10 are connected by the cable 24, the control signal may be transmitted by radio waves.

In the above embodiment, the reverse gamma correction circuit 14 provided in the television signal processing unit 12 once recovers the linear gamma characeristics for the standard television video signal supplied from the television signal conversion circuit 13, and then the video signal correction circuit 15 sets the gamma value for the standard television video signal to a proper value (0.45). Without providing the reverse gamma correction circuit 14, the video signal correction circuit 15 may directly set the gamma value for the standard television video signal supplied from the television signal conversion circuit 13, to a proper value. The former structure provides, however, a better image quality of the standard television video signal.

Figure 4:
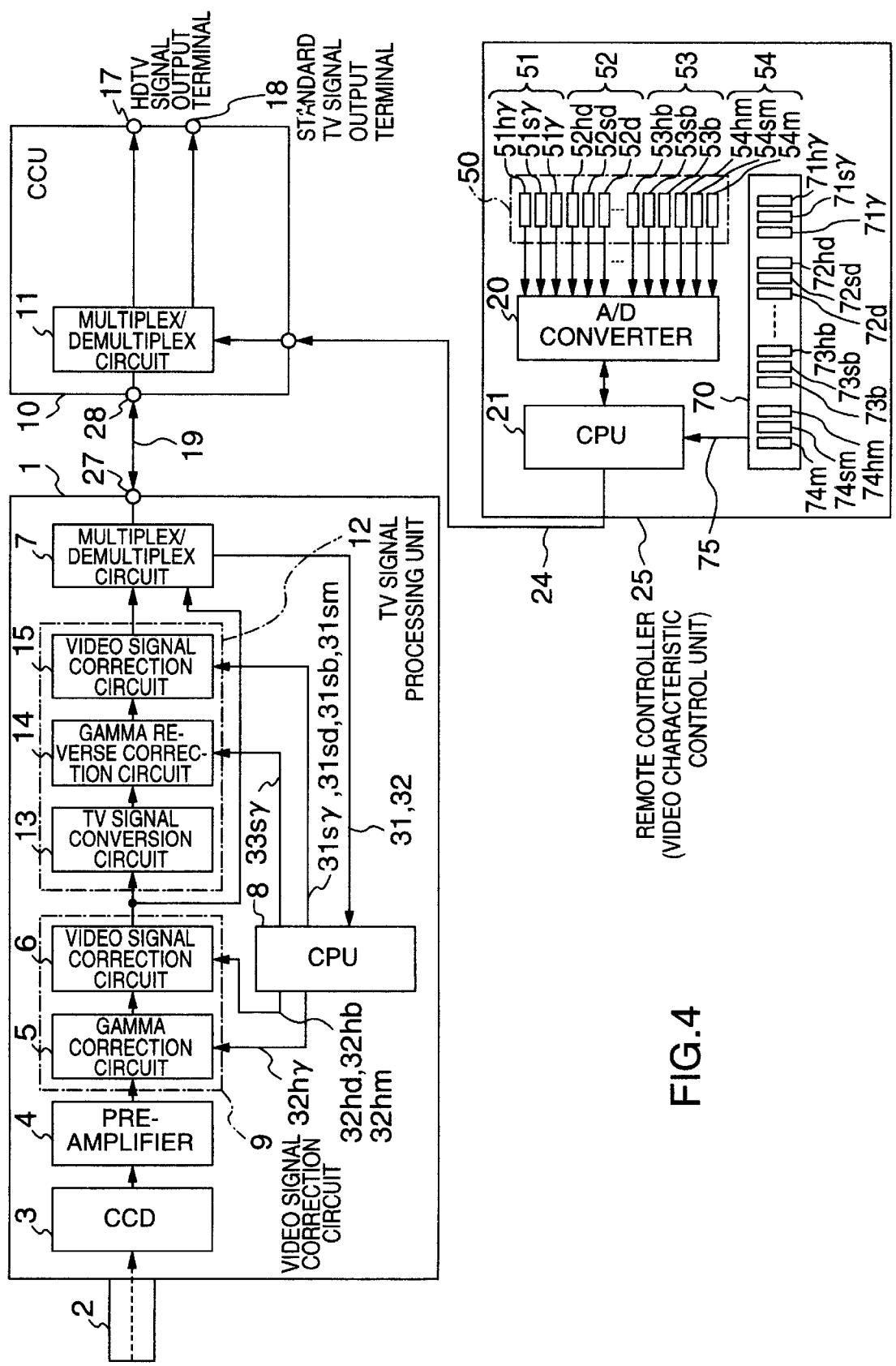
FIG. 4 is a block diagram showing the structure of a high definition television camera apparatus according to another embodiment of the present invention.

Also in the above embodiment, although the television signal processing unit 12 is provided in CCU 10, it may be provided in the camera head as shown in FIG. 4. In this case, the multiplex/demultiplex circuit 7 multiplexes the high definition television video signal from the video signal processing circuit 9 with the standard television video signal from the television signal processing unit 12 and transmits the multiplexed signal over the cable 19, and the multiplex/demultiplex circuit 11 demultiplexes the multiplexed signal into the high definition and standard television video signals and supplies them to the output terminal 17 and 18. Also in this case, CPU 16 is omitted and the control signals 31 and 32 from CPU 21 are supplied directly via the multiplex/demultiplex circuit 11 to CPU 8 of the camera head 1. CPU 8 supplies the separated control signals 31 and 32 to the video signal processing circuit 9 and television signal processing unit 12.

What is claimed is:

1. A high definition television camera apparatus, comprising:

a high definition television image pickup apparatus including a high definition television image pickup element for outputting a high definition television video signal, and a high definition television video signal correction circuit, coupled to said high definition television image pickup element, for correcting a gamma value of said high definition television video signal supplied from said image pickup element so as to have a first predetermined characteristic value being suitable for high definition television system;

a transmission path for transmitting said corrected high definition television video signal supplied from said high definition television image pickup apparatus; and a camera control apparatus including a television signal conversion circuit, coupled to said transmission path, for converting said corrected high definition television video signal transmitted via said transmission path into a first standard television video signal, a standard television video signal correction circuit, coupled to said television signal conversion circuit, for correcting a gamma value of said first standard television video signal supplied from said television signal conversion circuit so that said first standard television video signal is corrected to have a second predetermined characteristic value being suitable for standard television system, said corrected first standard television signal being supplied as a second standard television video signal, a standard television video signal output terminal coupled with said standard television video signal correction circuit, and a high definition television video signal output terminal coupled with said transmission path, wherein said high definition television video signal correction circuit further corrects at least one of detail, black balance and masking values of said high definition television video signal supplied from said image pickup element so as to have a proper value for said high definition television video signal and output the high definition television video signal having said first predetermined characteristic value, and wherein said standard television video signal correction circuit further corrects at least one of detail, black balance and masking values of said standard television video signal supplied from said television signal conversion circuit so as to have a proper value for said standard television video signal and outputs said standard television video signal having said second predetermined characteristic value.

2. A high definition television camera apparatus according to claim 1, wherein said standard television video signal correction circuit includes a reverse gamma correction circuit for reversely correcting the gamma value for the standard television video signal supplied from said television signal conversion circuit so as to have a proper value for said standard television video signal, and a gamma correction circuit for correcting said gamma value for said standard television video signal supplied from the reverse gamma correction circuit to have a proper value for the standard television video signal.

3. A high definition television camera apparatus according to claim 1, further comprising:
   a controller coupled to said camera control apparatus for controlling said first and second predetermined characteristic values.

4. A high definition television camera apparatus comprising:
   a high definition television image pickup unit;
   a camera control unit coupled to said high definition television pickup unit; and
   a control unit,
   wherein said control unit includes a high definition television video signal characteristic value adjusting unit for setting a characteristic value for a high definition television video signal, a standard television video signal characteristic value adjusting unit for setting a characteristic value for a standard television video signal, and a controller for outputting a high definition television video signal control signal representative of the set value set by the high definition television video signal characteristic value adjusting unit and a standard television video signal control signal representative of the set value set by the standard television video signal characteristic value adjusting unit;
   wherein said high definition television image pickup unit outputs a high definition television video signal, said high definition television image pickup unit includes a high definition television image pickup element for picking up an image of an object and outputting a high definition television video signal of the object, and a high definition television video signal correction circuit for correcting a characteristic value for the high definition television video signal supplied from the image pickup element to have the set value represented by the high definition television video signal control signal supplied from said control unit and outputting the high definition television video signal having the set value; and
   wherein said camera control unit includes a high definition television video signal output terminal from which the high definition television video signal transmitted via a transmission path from said high definition television image pickup unit is output, a television signal conversion circuit for converting the high definition television video signal supplied from said high definition television image pickup unit into the standard television video signal and outputting the standard television video signal, a standard television video signal correction circuit for correcting a characteristic value for the standard television video signal supplied from the television signal conversion circuit to have the set value suitable for standard television system represented by the standard television video signal control signal supplied from said control unit and outputting the standard television video signal having the set value, and a standard television video signal output terminal from which the standard television video signal from the standard television video signal correction circuit is output.

5. A high definition television camera apparatus according to claim 4, wherein:
   the high definition television signal characteristic value adjusting unit sets a gamma value for the high definition television video signal, and the standard television signal characteristic value adjusting unit sets a gamma value for the standard television video signal;
   the high definition television video signal correction circuit corrects a gamma value for the high definition television video signal supplied from the image pickup element to have the set value represented by the high definition television video signal control signal supplied from said control unit and outputting the high definition television video signal having the set value; and
   the standard television video signal correction circuit corrects a gamma value for the standard television video signal supplied from the television signal conversion circuit to have the set value represented by the standard television video signal control signal supplied from said control unit and outputting the standard television video signal having the set value.

6. A high definition television camera apparatus according to claim 5, wherein:
   the high definition television signal characteristic value adjusting unit further sets at least one of detail, black balance and masking values for the high definition television video signal, and the standard television signal characteristic value adjusting unit further sets at least one of detail, black balance and masking values for the standard television video signal;
   the high definition television video signal correction circuit further corrects at least one of detail, black balance and masking values for the high definition television video signal supplied from the image pickup element to have the set value represented by the high definition television video signal control signal supplied from said control unit and outputting the high definition television video signal having the set value; and
   the standard television video signal correction circuit further corrects at least one of detail, black balance and masking values for the standard television video signal supplied from the television signal conversion circuit to have the set value represented by the standard television video signal control signal supplied from said control unit and outputting the standard television video signal having the set value.

7. A high definition television camera apparatus according to claim 4, wherein:
   the high definition television signal characteristic value adjusting unit sets a gamma value for the high definition television video signal, and the standard television signal characteristic value adjusting unit sets a gamma value for the standard television video signal;
   the high definition television video signal correction circuit corrects a gamma value for the high definition television video signal supplied from the image pickup element to have the set value represented by the high definition television video signal control signal supplied from said control unit and outputting the high definition television video signal having the set value; and the standard television video signal correction circuit comprises: a reverse gamma correction circuit for reversely correcting a gamma value for the standard television video signal supplied from the television signal conversion circuit to have an inverse of the set value represented by the high precision television video signal control signal supplied from said control unit and outputting the high precision television video signal having the inverse; and a gamma correction circuit for correcting a gamma value for the standard television video signal supplied from said reverse gamma correction circuit to have the set value represented by the standard television video signal control signal and outputting the standard television video signal having the set value.

8. A high definition television camera apparatus according to claim 4, wherein:

said control unit further comprises an associative characteristic value adjusting unit for setting in combination characteristic values for both the high precision and standard television video signals; and the controller corrects a set value set by the high definition television signal characteristic value adjusting unit in accordance with a set value set by the associative characteristic value adjusting unit, and outputs the corrected set value as the high precision television video signal control signal, and the controller corrects a set value set by the standard television signal characteristic value adjusting unit in accordance with the set value set by the associative characteristic value adjusting unit, and outputs the corrected set value as the standard television video signal control signal.

9. A high definition television camera apparatus having a high definition television image pickup unit and a camera control unit coupled thereto via a transmission path, comprising:

a control unit comprising: a high definition television video signal characteristic value adjusting unit for setting a characteristic value for a high definition television video signal; a standard television video signal characteristic value adjusting unit for setting a characteristic value for a standard television video signal; and a controller for outputting to said camera control unit a high definition television video signal control signal representative of the set value set by the high definition television video signal characteristic value adjusting unit and a standard television video signal control signal representative of the set value set by the standard television video signal characteristic value adjusting unit, wherein:

said high definition television image pickup unit outputs a high definition television video signal, said high definition television image pickup unit comprising: a high definition television image pickup element for picking up an image of an object and outputting a high definition television video signal of the object; and a high definition television video signal correction circuit for correcting a characteristic value for the high definition television video signal supplied from the image pickup element to have the set value represented by the high definition television video signal control signal supplied from said control unit via said camera control unit and said transmission path and outputting the high definition television video signal having the set value; and said camera control unit comprises: a high definition television video signal output terminal from which the high definition television video signal itself transmitted via a transmission path from said high definition television image pickup unit is output; a television signal conversion circuit for converting the high definition television video signal supplied from said high definition television image pickup unit into the standard television video signal and outputting the standard television video signal; a controller for transmitting the high definition television video signal control signal supplied from said control unit to said high definition television image pickup unit via said transmission path and supplying the standard television video signal control signal supplied from said control unit to a standard television video signal correction circuit, said standard television video signal correction circuit correcting a characteristic value for the standard television video signal supplied from the television signal conversion circuit to have the set value suitable for the standard television system represented by the standard television video signal control signal supplied from said controller and outputting the standard television video signal having the set value; and a standard television video signal output terminal from which the standard television video signal from the standard television video signal correction circuit is output.

10. A high definition television camera apparatus according to claim 9, wherein:

the high definition television signal characteristic value adjusting unit sets a gamma value for the high definition television video signal, and the standard television signal characteristic value adjusting unit sets a gamma value for the standard television video signal;

the high definition television video signal correction circuit corrects a gamma value for the high definition television video signal supplied from the image pickup element to have the set value represented by the high definition television video signal control signal and outputting the high definition television video signal having the set value; and the standard television video signal correction circuit corrects a gamma value for the standard television video signal supplied from the television signal conversion circuit to have the set value represented by the standard television video signal control signal and outputting the standard television video signal having the set value.

11. A high definition television camera apparatus according to claim 10, wherein:

the high definition television signal characteristic value adjusting unit further sets at least one of detail, black balance and masking values for the high definition television video signal, and the standard television signal characteristic value adjusting unit further sets at least one of detail, black balance and masking values for the standard television video signal;

the high definition television video signal correction circuit further corrects at least one of detail, black balance and masking values for the high definition television video signal supplied from the image pickup element to have the set value represented by the high definition television video signal control signal supplied from said control unit and outputting the high definition television video signal having the set value; and the standard television video signal correction circuit further corrects at least one of detail, black balance and masking values for the standard television video signal supplied from the television signal conversion circuit to have the set value represented by the standard television video signal control signal and outputting the standard television video signal having the set value.

* * * * *